(12) United States Patent
Oldenburg

(10) Patent No.: US 6,315,296 B1
(45) Date of Patent: *Nov. 13, 2001

(54) FLANGELESS RETROFITTABLE SEVERE DUTY SEAL FOR A SHAFT

(75) Inventor: Michael R. Oldenburg, Madelia, MN (US)

(73) Assignee: Transcom, Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,570

(22) Filed: Sep. 22, 1999

Related U.S. Application Data

(63) Continuation-in-part of application No. 08/937,427, filed on Sep. 25, 1997, now Pat. No. 6,186,507.

(51) Int. Cl.[7] .............................. F16J 15/32; F16J 15/34
(52) U.S. Cl. .................... 277/353; 277/402; 277/407; 277/562; 277/565; 277/571; 277/572; 277/573
(58) Field of Search .................... 277/352, 353, 277/371, 374, 402, 407, 549, 560, 562, 565, 566, 571, 572, 573

(56) References Cited

U.S. PATENT DOCUMENTS

| | | |
|---|---|---|
| 3,022,081 | 2/1962 | Kosatka . |
| 3,135,518 * | 6/1964 | Carson et al. . |
| 3,606,351 | 9/1971 | Hallerback . |
| 4,285,526 * | 8/1981 | Klinteberg et al. . |
| 4,516,783 * | 5/1985 | Mitsue et al. . |
| 4,696,479 * | 9/1987 | Karcher . |
| 5,042,822 | 8/1991 | Dreschmann et al. . |
| 5,096,207 | 3/1992 | Seeh et al. . |
| 5,183,269 * | 2/1993 | Black et al. . |
| 5,340,125 | 8/1994 | Brown et al. . |
| 5,348,312 | 9/1994 | Johnston . |
| 5,522,600 | 6/1996 | Duckwall . |
| 5,582,412 * | 12/1996 | Sabo Filho . |
| 5,655,781 * | 8/1997 | Petrak . |
| 5,716,277 | 2/1998 | Reynolds . |
| 5,944,321 * | 8/1999 | Niebling et al. . |
| 6,186,507 * | 2/2001 | Oldenburg . |

* cited by examiner

Primary Examiner—Anthony Knight
Assistant Examiner—John L. Beres
(74) Attorney, Agent, or Firm—Dorsey & Whitney LLP

(57) ABSTRACT

A unitary sleeve lip seal can be used to provide permanently lubricated sealed bearings in severe service conditions such as the track pins of track-driven vehicles and agricultural equipment. The seal has a labyrinthine exclusion path and multiple dust lips contacting the sleeve in addition to the main sealing lip. A garter spring encircling the main sealing lip may enable the seal to operate at moderately elevated pressures. The sleeve has a radial flange at the outermost end. Elastomeric lips extend between the sleeve flange and a faceplate that terminates the outside end of the seal housing. The seal is packed with water-resistant grease and can, when installed in association with grease-packed bearings can create a permanently lubricated bearing/shaft assembly that requires no re-greasing. Resilient coatings both protect the sleeve and case and also improve leak resistance, especially when the seal is retrofitted onto shafts that have been damaged. The design provides a seal having performance that is comparable to that of dual cone face seals at a much lower cost and in a much smaller assembly. Seals made according to this design can easily be made in standard sizes that can serve as direct replacements for previously available seals.

9 Claims, 4 Drawing Sheets

FLANGELESS RETROFITTABLE SEVERE DUTY SEAL FOR A SHAFT

RELATED APPLICATIONS

This application is a Continuation-in-part of Ser. No. 08/937,427 filing date Sep. 25, 1997 U.S. Pat. No. 6,186,507, issued on Feb. 13, 2001 to Michael R. Oldenburg, entitled Retrofittable Severe Duty Seal For A Shaft.

TECHNICAL FIELD

The present disclosure is related to the field of seals for sealing rotary shafts, generally. The methods and apparatus are particularly related to the field of unitary combination lip and sleeve seals. More specifically, this is an improved seal adapted for use in severe duty applications including construction equipment, agricultural machinery, track driven vehicles, and other applications where oil or grease must be held in contact with rotary shaft and bearing assemblies. This seal and other seals of this type must also operate as excluder seals to keep lubricated surfaces free from corrosives, acids, other chemicals, dirt, mud, dust, abrasives, water and other contaminants. Even more particularly, this seal incorporates design features that enhance performance (compared to usual original equipment seals) when installed on shafts that have been slightly damaged by normal wear. Most specifically, this seal can be used as a pin or roller seal for track driven vehicles.

BACKGROUND AND SUMMARY

The present seal structure yields a very important benefit that has eluded other persons skilled in the art. It can be retrofitted to existing, worn machinery to enhance the protection of costly lubricated machine components. This seal can replace existing seals, and the performance of this seal exceeds that of all other standard-sized, commercially available, conventional, lip and sleeve type seals. The only commercially available type of seal with performance comparable to this embodiment is the dual cone face seal. It is known by those in the art that dual cone face shields have disadvantages that significantly restrict their use. The seal disclosed here overcomes the two major inherent disadvantages of dual cone face seals—large size and high cost.

Conventional unitized lip and sleeve seals are much smaller than dual cone face seals. Since this seal can be installed as a direct replacement for ordinary seals, it can be specified and used without making any modifications to the design of an existing machine. The shaft, the bore, and the housing in which the seal operates are identical whether the present seal or conventional seals are used. Wherever dual cone face seals are desired, the machine must have been originally designed specifically for their use because they are much larger than ordinary seals. They are simply too big to fit all of the machine locations where their superior performance could justify the significant added cost.

However, the availability of a seal having the superior performance characteristics of an embodiment according to the present disclosure in a package the size of ordinary seals gives additional freedom to designers of heavy machinery and severe duty assemblies. Design possibilities made available by this new seal include increasing the size of wear surfaces without the necessity of increasing the overall size of the assembly to enhance the useful life of machines and their component parts. Another design possibility is to expand the utility of existing designs by making them better adapted for broader ranges of service.

The cost of making a seal according to the present disclosure is only a fraction of the cost of making a dual cone face seal. Cost savings can be substantial because the manufacturing cost for a dual cone face seal is currently between twenty and ninety times the cost of a conventional seal. A preferred embodiment of the present disclosure is expected to be two to three times the cost of a conventional seal. In some applications, such as crawler vehicles, a single machine will typically require 40 to 60 roller seals, each of which is subjected to extremes of heat, cold, moisture, dust, abrasives, acids and alkalis. In addition, the loads imposed on track vehicle components fluctuate extremely. For example, a roller may be subject to little load while the vehicle operates on a flat, level surface; but when tracks advance to a raised obstruction such as a rock, each roller that moves over the rock may be sequentially required to support almost the entire weight of the vehicle. The constantly fluctuating loads exacerbate the effects of any deviation from component design tolerances.

The most important benefit of the seal now disclosed is that it can create permanently lubricated shaft and bearing assemblies that can withstand severe use. This seal may enable equipment manufacturers to improve the performance of their machinery by reducing maintenance requirements. It is believed that existing vehicles and other machines can be retrofitted advantageously by replacing the original re-greasable seals with this new permanently lubricated seal. It is to be understood, however, that the present seal can be used to seal in either oil or grease and to exclude all environmental contaminants that do not attack the materials from which the seal is manufactured.

It is an object of the invention to accomplish the foregoing and to teach the structure of an externally flangeless retrofittable severe duty seal for a shaft.

It is a further object of this disclosure to show an embodiment useful for sealing bearings in shaft-mounted rotary rollers used in track-driven vehicles.

Another object is to provide an embodiment that may be useful in any application where a shaft and shaft bearing or bushing surfaces may be exposed to mud, dust, abrasives, cement, submersion, abrasive liquids or other substances that could damage relative rotary mechanical components.

Another object hereof is to disclose a seal that lasts longer than previously known low cost seals adapted for severe duty applications.

Another object of the present disclosure is to make essentially all of the important benefits of a dual cone face seal available at a much lower cost.

Yet another object hereof is to make essentially all of the important benefits of a dual cone face seal available in a physically smaller assembly.

It is an object to make essentially all of the important benefits of a dual cone face seal available in an assembly having the same physical dimensions as a conventional single lip or double lip seal.

Another object hereof is to provide an embodiment that can function as an excluder seal, as a grease seal, as an oil seal, and as a seal for other liquids at low and moderate pressures.

Another object of this disclosure is to provide a seal having a shaft-contacting sleeve that enables the seal to be installed on and to operate reliably with shafts having imperfections such as those ordinarily caused by wear and use.

Another specific object is to provide a unitary seal structure that both improves reliability, and makes seal installation easier compared to installation of seals that are composed of two or more separable parts.

A further object is to provide a seal with sealing elements that include: a main sealing lip with a garter spring that biases the main sealing lip against the outside of the sleeve, at least one dust lip that contacts the sleeve, at least one dust lip that contacts the inner surface of the housing, at least one face dust lip that contacts the inner surface of the faceplate, and an elastomeric, shaft-contacting faceplate ring.

These and further objects of the apparatus taught in accordance with this specification, the claims, and the appended drawing figures are set forth below.

DISCLOSURE OF THE INVENTION

The present disclosure Shows an externally flangeless, unitized, retrofittable, radial lip seal for a paired shaft and bore assembly rotatable with respect to one another having a sleeve that may be disposed coaxially on the shaft. The term externally flangeless refers to seals in which the flanges are inside the seal, i.e., inside the seal case. Consequently, externally flangeless seals disclosed in the specification have sleeve and case flanges that are internal flanges, i.e., flanges that are inside the seal case. The sleeve has an inner end, (oil side) that would normally be in contact with the grease, oil, or other fluid to be contained within a housing, an outer end (dirt side) opposite, a bore that has an elastomeric coating, and a sleeve flange extending radially outward from the outer end of the sleeve and generally perpendicular to the sleeve axis. The sleeve flange is terminated with an outer edge. One or more circular elastomeric faceplate-contacting lips extend coaxially opposite the oil side from the sleeve flange outer face.

A circular elastomeric perimeter lip extends radially and outwardly from the outer edge of the sleeve flange to contact a generally cylindrical hollow seal case adapted for fitting into a bore, such as a bore that is formed through a roller end plate, the wall of a housing, or other securement.

The case is formed from a generally cylindrical case body having an outside surface, or outside diameter, that may be disposed within a bore and in contact with the wall of the bore. An elastomeric coating may be affixed to the outside of the case body. By coating the outside of the metal case body with an elastomeric coating or layer, it is possible for the seal to securely fit a bore that has become slightly damaged through use.

The inner surface of the case is smoothly finished in the region close to the outer end to properly adapt it for maintaining continuous operating contact with the perimeter lip of the sleeve flange. The case has an inner, fluid-contacting, end opposite the outer end; the inner end is sometimes referred to as the "oil side." A case flange extends radially inward from, and generally perpendicular to, the outside end of the case. Various processes such as drawing, coining, or forging may be employed to make the case body and the case flange as a unit from a single piece of cylindrical tubular material. An equivalent case body and case flange assembly may also be formed by joining separate component parts.

Two case inner flanges are located between the outer end and the fluid end of the case. The case inner flanges extend radially inward from the case to support two axially spaced-apart seal elements, each of which may be fitted with a garter spring.

The case inner flanges extend radially inwardly from, and generally perpendicular to, the longitudinal axis of the inside of the case. When formed of two additional pieces of material, preferably coated with elastomer, the case has double thickness of material. The case reinforcement provided by the double layer of metal makes allows the use of a slightly thinner material to form the case body than would be necessary if the case material was a single thickness. Other methods of construction may be adopted, however, without departing from the scope of the invention disclosed. For example, one or more case inner flanges may be inserted into the case sequentially.

A sleeve-contacting secondary sealing lip may be formed on the radial flange of a first, or medial, insert. When the seal is assembled, grease such as Esso Beacon 325 or any other high quality, light, stable grease is applied to the surfaces of the sleeve and it is placed with the sleeve flange proximate the faceplate. The first, or medial insert is then greased and placed in the case with the seal lip, which may be fitted with a biasing garter spring, contacting the sleeve. Additional excluder, or dust, lips may extend from the radial flange of the insert to contact the sleeve and/or the sleeve flange.

A second, or oil side, insert may then be placed into the case with the oil side insert flange having a primary oil seal affixed to it and biased against the sleeve by a garter spring. One or more excluder lips may also be formed as part of the oil side insert to provide additional assurance that contaminants will not penetrate and contaminate the lubricant and bearing surfaces. It is desirable to fill the void spaces with grease during assembly. The grease reduces friction and wear, provides additional barriers to dust and other contaminants, and enhances seal performance by preserving the resiliency of elastomeric portions.

When the seal has been packed with grease and assembled, the inner end of the case may be crimped over the oil side insert inner end to secure the assembly and prevent dis-assembly during installation or use.

At least one sleeve-contacting, elastomeric, sealing lip extends from each case inner flange to operatively contact the outer surface of the sleeve at a region near the inner end of the sleeve. The main sealing lips may be fitted with a garter spring to enable the assembly to operate at higher pressures. Testing has confirmed that the seal disclosed herein can operate reliably at a pressure of one atmosphere (15 p.s.i.) with shaft speeds of 700 feet per minute.

The maximum pressure at which this seal, like seals in general, can reliably operate decreases with increasing shaft speed. Testing may show that operation is satisfactory at pressures of approximately 100 p.s.i. or that slight changes could allow the seal to operate in the range of 100 p.s.i. However, testing at higher pressures and rotational velocities had not been concluded before preparation of the present disclosure.

The primary and the secondary sealing lips extend inwardly, toward the inner end and medial region of the sleeve, coaxially with the sleeve. One or more dust lips are positioned to extend radially inwardly from the medial insert flange into coaxial contact with the sleeve outer surface. One of the inwardly oriented dust lips, the mid-sleeve dust lip, may be disposed generally between the case inner flange aperture and the sleeve outer surface. The optional second sleeve contacting dust lip, the forward sleeve dust lip, is disposed generally midway between sleeve flange and the medial insert flange. A third dust lip, the medial insert flange dust lip, extends axially outwardly from the medial insert flange. The three dust lips and the secondary sealing lip are molded at high temperatures in one piece using a single mold operation and bonded to the insert with suitable bonding agents.

A resilient layer may cover the outside of the case to improve sealing in conditions where soft, damaged, or other less than optimal bore conditions exist that would impair reliable sealing with a steel outer case surface. It is possible to cover the oil side insert and form the primary seal element similarly. In applications that might expose the sealed materials to corrosion, it is preferred to cover with resilient rubberized material all of the portions of the seal case that are likely to contact the corrosive agents.

The case elastomeric coating is formed with a chamfer to minimize the likelihood that the seal will be damaged during installation. One or more optional radial case relief channels may be formed in the case elastomeric coating. A relief channel may reduce relieves the tendency of the elastomeric coating to form a bulge that could cause the seal to become unseated and move axially after installation. It is also possible to provide radial ribs on the outer surface of the case elastomeric coating for the purpose of providing desired installation properties.

A generally planar circular faceplate has an inside surface, an outside surface, and a central aperture slightly larger than the inside diameter of the sleeve. The plane of the inner faceplate surface is disposed generally parallel to the case skirt and the face of the sleeve flange. An elastomeric portion, or faceplate wiper ring, can be attached to the faceplate at the central aperture so that the faceplate wiper ring extends between the faceplate and the shaft. The faceplate wiper ring has an internal diameter that allows it to contact the shaft and thereby exclude contaminants from the remainder of the seal and the sealed components.

The sleeve bore is preferably coated with an elastomeric, or rubberized, coating to make it possible to obtain adequate sealing performance when the shaft condition is substandard due to wear, eccentricity, or other causes. A sleeve radial channel may be formed generally midway between the sleeve inner end and the sleeve outer end. The channel relieves shear tension that may develop during installation. The result is that it is easier to install the sleeve and the potential for damage to the sleeve during installation is reduced.

Chamfers are provided at both the inner end and at the outer end of the sleeve bore to reduce the potential for damage to the seal, the shaft, or the housing during installation. In addition, the inner end of the case outer surface is chamfered to make insertion of the sleeve through the housing easier and less likely to damage the dust lips or other components.

The flange peripheral lip and face lips may be formed in the same molding operation that is used to mold the sleeve bore elastomeric coating. The face lips may be designed with shapes similar to those of the peripheral lip and the three dust lips. However, an alternative design for the face lips is disclosed herein. The undercut face lips are adapted to provide superior performance in severe duty operating conditions. The advantage accrues because the undercut lip inside surface responds with increasing pressure in response to contact with materials that would penetrate the seal. The other lips contact the mating seal surface at distinctly different approach angles and with quite different elastomer shapes and configurations.

It is preferred to have the inner side of the faceplate smoothly finished to reduce wear on the face lips of the seal. Likewise, the outer surface of the sleeve, the sleeve flange inner face, and the perimeter lip-contacting medial insert inside cylindrical surface may be finished to a condition of low surface roughness to reduce the amount of wear to which the various elastomeric excluder and seal lips are subjected. For this reason, it is generally preferred to make the sleeve, case, and faceplate of metal such as stainless steel, carbon steel, or similar materials. It is to be understood, however that the sleeve, case, and faceplate may be made from other metals and also from non-metallic materials.

In seals of this nature, the seals are normally described by reference to the cross-sectional configuration. The seal of the present embodiment may readily be manufactured in sizes between 0.5 inches and 26 inches with other sizes available on request. By way of example only and without any limitation on the configuration of embodiments of this disclosure, a representative seal may have an inside (shaft) diameter of 3⅛", an outside (bore) diameter of 4⅛", with an overall width of about 1". The various dimensions do not scale proportionately. For example, the same type of seal may be manufactured for a 6¼" shaft diameter but still have an overall width of 1" and be designed to fit into a 7¾" bore. Seals adapted to various purposes may vary in width from less than ⅛" to over 1" but generally have a width between ¼" and ¾".

It is to be understood, as well, that many different formulations of the elastomeric, or rubberized, elements may function satisfactorily. Viton®, nitrile, carboxylated nitrile, polyacrylate, ACM, fluroelastomers, and silicone compounds are known to provide useful operational characteristics when adapted for incorporation within the seal presently disclosed. Other materials may also be incorporated to confer chemical resistance, extreme temperature resistance, expanded operating pressure range, wear resistance, or other desired properties to the final seal assembly.

DESCRIPTION OF THE PREFERRED EMBODIMENTS

Figure 1:
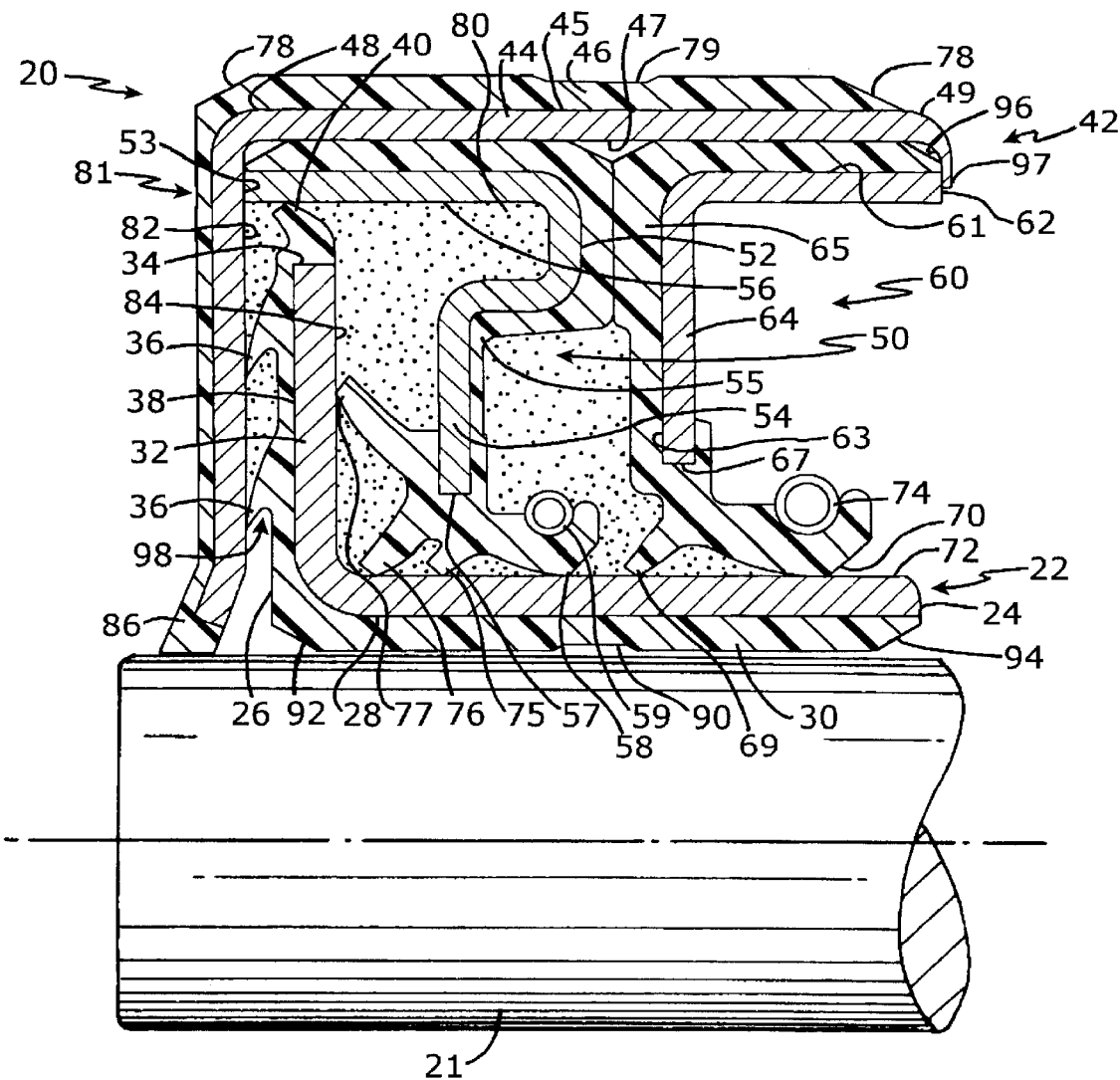
FIG. 1 shows a cross-sectional profile of a flangeless retrofittable severe duty seal for a shaft according to the present disclosure.

Referring now to the various figures of the accompanying drawing, FIG. 1 depicts a cross-sectional profile of an embodiment of the externally flangeless retrofittable sever duty seal 20 fitted onto a shaft 21. A cylindrical sleeve 22 component is disposed coaxially over, and in contact with, the shaft 21 so that when installation is complete, the sleeve 22 is affixed to the shaft 21. The sleeve inner end 24 extends into the sealed region, normally a housing or containment for oil or grease used to lubricate gears, bearings, or other moving parts.

To simplify nomenclature in this specification, the side or end or surface of a component that is oriented toward the lubricants, lubricated components, or other media from which it is desired to exclude dust, water, mud, and other environmental contaminants may be referred to using the terms "inner," "inward," "inside," and similar terms. The words "outer," "outward," "outside" and similar terms may be used to refer to a side, end, or surface of a component that is oriented away from the sealed region, toward the exterior of a housing, or toward the unsealed overall environment into which a shaft extends.

Between the sleeve inner end 24 and the sleeve outer end 26, the sleeve bore 28 may optionally be coated with an elastomeric coating 30. The optional sleeve bore elastomeric coating 30 is desirable because it may prevent leakage from between the seal 20 and the shaft 21 even when the shaft is worn, damaged, or otherwise imperfect.

A sleeve flange 32 extends radially outwardly from the sleeve outer end 26 and has a sleeve flange outer edge 34 at its outer periphery. At least one, and preferably two, face lips 36 extend coaxially outwardly from the sleeve flange 32 outer face 38 and a perimeter lip 40 extends radially outwardly from the sleeve flange outer edge 34. The sleeve bore elastomeric coating 30, the face lips 36, and the perimeter lip 40 may be integrally formed and bonded to the sleeve 22 in a single injection molding operation.

A seal case 42 is disposed coaxially outside the sleeve 22. The seal case 42 has a generally cylindrical case body 44 designed so that the case outside surface 45 can fit into and seal against a bore in a housing or flange through which the shaft 21 to be sealed extends. It is preferred to enclose the case outside surface 45 with an optional case elastomeric coating 46. The seal 20 is less likely to leak when installed in a damaged bore if the optional case elastomeric coating 46 is provided. The case body 44 has a case inner surface 47 that may be smoothly finished in the region near the case outer end 48 if the perimeter lip 40 will contact it.

The case inner end 49 is axially opposite the case outer end 48. An insert 50 (if there is more than one insert, a "first" or "medial" insert 50) may be introduced within the case 42 through the case inner end 49. The medial insert 50 has an outer surface 51, an insert inner end 52 and an outer end 53 that are securely disposed against the case inner surface 47 and the case outer end 48.

A first insert flange 54 extends radially inwardly from the case body 44 toward the sleeve 22. The first insert flange 54 has a circular central aperture through which the shaft 21 and sleeve 22 fit. Positioning the insert 50 within the case body 44 reinforces the structure with a double layer of the material from which the case body 44 is made. In addition, the insert flange 54 stiffens the case body 44.

It may be desirable to coat the case 44 contacting insert 50 surface with an elastomer coating 55 opposite the first insert inside cylindrical surface 56. The elastomer coating 55 may extend to the insert flange bore 57 and may also be used to integrally form the seal lip 58 and excluder lips.

The secondary sealing lip 58 (in configurations having multiple inserts, otherwise it is the primary sealing lip) attaches to the case medial, or first, insert flange 54 and extends both axially inwardly and radially inward from the first insert flange 54. The sealing lip 58 may be biased radially inwardly by a garter spring 59.

A optional second, or oil side, cylindrical insert 60 may also be fitted within the case body 44. An oil side insert outer surface 61 can be disposed against the case body inner surface 47 with the second insert inner 62 end proximate the case inner end 49 and the second insert outer end 63 adjacent the first insert inner end 52. An oil side flange 64 extends radially inwardly toward the sleeve 22 and has affixed to it the elastomer coating 65 that also coats the oil side flange bore 67. One or more oil side excluder lips 69 and the primary seal 70 may be formed integrally from the elastomeric coating 65 applied to the insert 60.

The primary seal lip 70 contacts the sleeve outer surface 72 to form the sealing element by which the contents (generally fluids) of the sealed volume are prevented from transferring to the outside of the assembly. A biasing spring 74 may urge the main seal lip 70 against the sleeve outer surface 72.

Likewise, the secondary sealing lip 58 is optionally biased against the sleeve outer surface 72 by a garter spring 59. The sleeve outer surface 72 may be polished or otherwise finished to retard wear of the elastomeric elements. Additional contaminant excluding elements are situated axially outwardly from either or both the primary seal lip 70 and or the secondary sealing lip 58. These additional dust lips (also called excluder lips) may extend between the case body 44 or from the inserts 50 60 disposed within the case body 44 and brought into contact with the sleeve outer surface 72 or the inner side of the sleeve flange 32.

A mid-sleeve dust lip 75 may be located generally between the first insert flange 54 and the sleeve outer surface 72. A forward sleeve dust lip 76 may be disposed against the sleeve outer surface 72 at a location close to the sleeve flange 32. A sleeve flange dust lip 77 may extend from the first insert flange 54 to contact the sleeve flange 32. The case elastomeric coating 46, the main sealing lip 70, the mid-sleeve dust lip 75, the forward sleeve dust lip 76 and the sleeve flange dust lip 77 may be integrally formed and bonded to the first insert 50 in a single injection molding operation.

On the inner end of the case body 44, the case elastomeric coating 46 is finished with a case elastomeric coating chamfer 78 to make it easier to install the seal 20 without distortion or damage. A case outside diameter relief channel 79 is formed in the case elastomeric coating 46. The optional relief channel 79 relieves axial shear stresses from the case elastomeric coating 46 that may be induced by the process of installing the seal 20 into a bore. Application of grease 80 to the shaft 21 or bore during installation is generally not recommended.

Three main sub-assemblies, the sleeve 22, the case 42, and the faceplate 81 are interconnected to form a complete seal 20. These three sub-assemblies are normally made primarily of steel or another metal that is shaped, worked, and polished using conventional metalworking techniques and commercially available equipment. It may be advantageous to smooth the metal surfaces that are contacted by the various elastomeric components to obtain a metal finish having low surface roughness. Carefully shaped and molded elastomeric compounds are bonded to the metal components in the configurations shown in the accompanying drawing. It is possible to form the elastomeric components and attach them to the metal structures in a variety of ways; however, injection molding is believed preferable for these purposes.

Final assembly of the seal 20 is performed by carrying out four additional steps. First, water-resistant grease 80, such as Esso Beacon 325™ is packed to fill all of the voids between the lips and between the inserts 50 60. Second, the sleeve 22 is inserted into the seal case 42 so that the sleeve flange dust lip 77 contacts the sleeve flange 32 and the perimeter lip 40 contacts the perimeter lip-contacting case inner surface 47 or an equivalent cylindrical inner surface. Third, grease 80 is packed into the interstices between the individual face lips 36 and also between the perimeter lip 40 and the outermost of the face lips 36. Fourth, the inserts 50 60 are secured within the seal case 42 by crimping or other means to complete the assembly and unitizing process.

After the sleeve 22 is fitted within the seal case 42, the faceplate inner side 82 contacts the face lips 36 and the sleeve flange inner face 84 is brought into contact with the sleeve flange dust lip 77.

An optional elastomeric faceplate wiper ring 86 can be bonded to a central aperture in the faceplate 81 coaxial with, and through which, the shaft 21 extends.

A sleeve radial channel 90 is preferably formed within the sleeve bore elastomeric coating 30 to relieve shear as the sleeve 20 is fitted to a shaft. The sleeve 22 is finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 42 may be fitted with a case inner end chamfer 96 to reduce damage to the case elastomeric coating 46 when the case is fitted with elastomeric coating and to prevent case distortion in embodiments without case elastomeric coating 46. A case crimp 97 is used to prevent the inserts 50 60 from becoming dislodged during installation and operation.

It is believed preferable for the face lips 36 to be sharply angled radially inwardly with an acute point at the innermost portion of each of the face lips 36. In order to form a lip having such a shape, it may be necessary to include a face lip undercut angle 98 that is less than 90 degrees to obtain the desired performance characteristics. The face lips 36 may be formed having a generally triangular cross-section.

Figure 2:
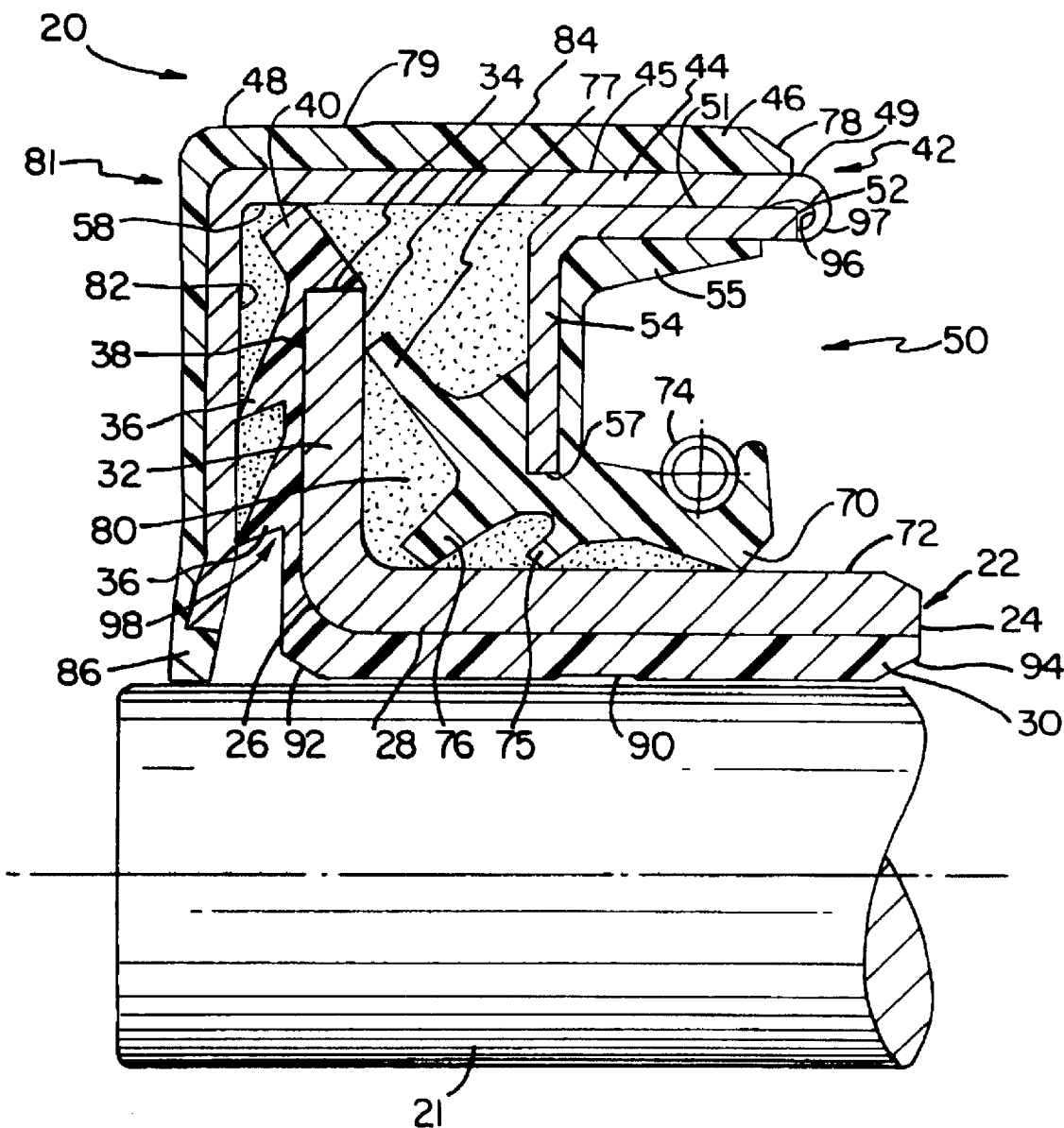
FIG. 2 shows a cross-sectional profile of an alternative embodiment of a flangeless retrofittable severe duty seal for a shaft which has only one insert and seal lip.

FIG. 2 shows an embodiment wherein the seal 20 is fitted with a single insert 50 and sealing lip 70. Although there may be some loss of ruggedness in this configuration, the countervailing considerations are that the seal can have a narrower profile, lower cost, lighter weight, lower rolling resistance, and still has excellent performance and durability.

Figure 3:
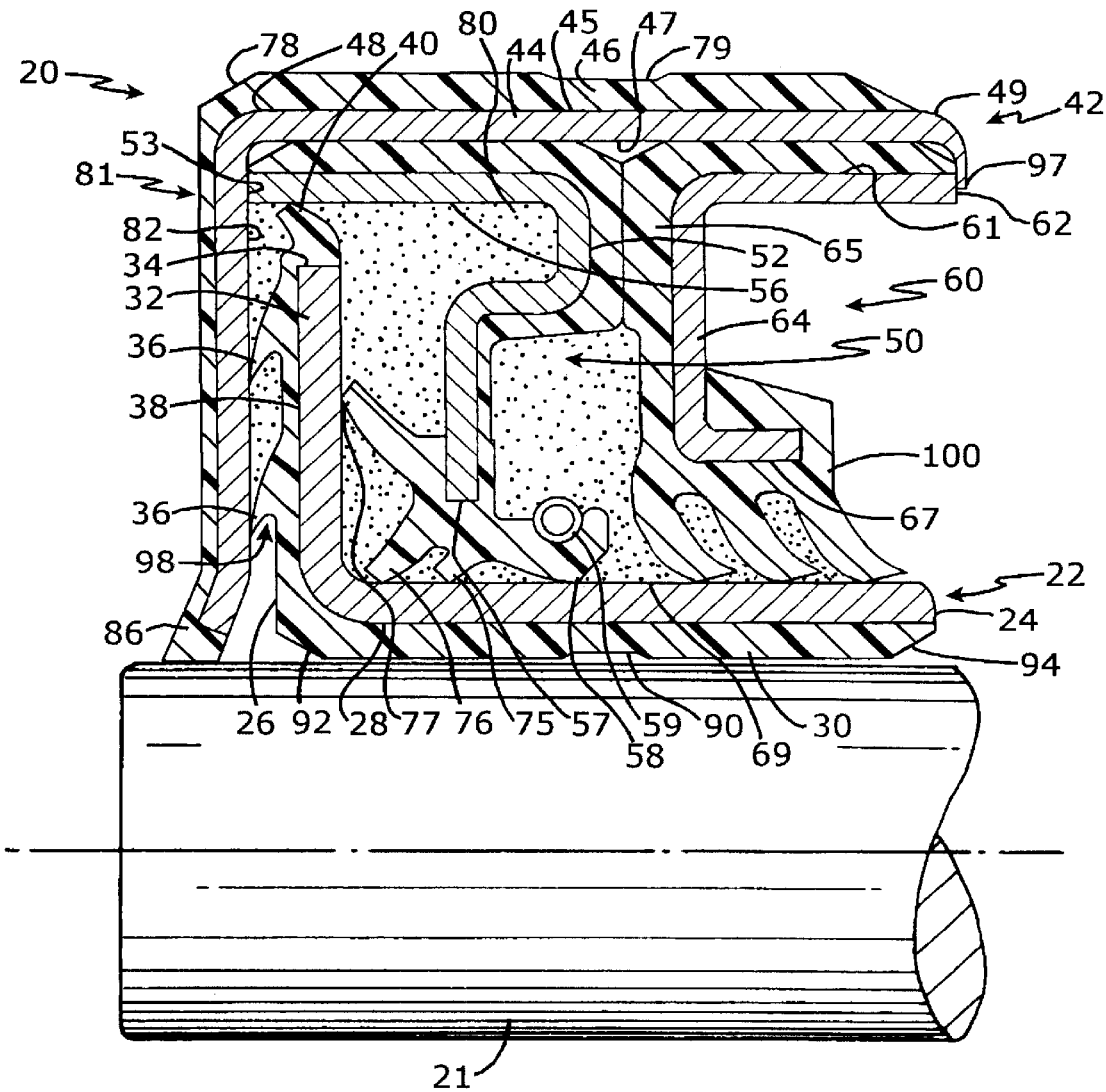
FIG. 3 shows a cross-sectional profile of the structure of an alternative embodiment of the seal of FIG. 1 that has an alternative configuration for the main sealing lip.

FIG. 3 shows an alternative embodiment of the seal 20 wherein a triple lip main seal 100 is used in place of the single lip primary seal 70 with garter spring 74. Otherwise, the configuration is similar to that depicted in FIG. 1. The triple lip seal 100 may allow a narrower profile, but will often require a seal configuration that has more radial space (i.e. increased height).

Figure 4:
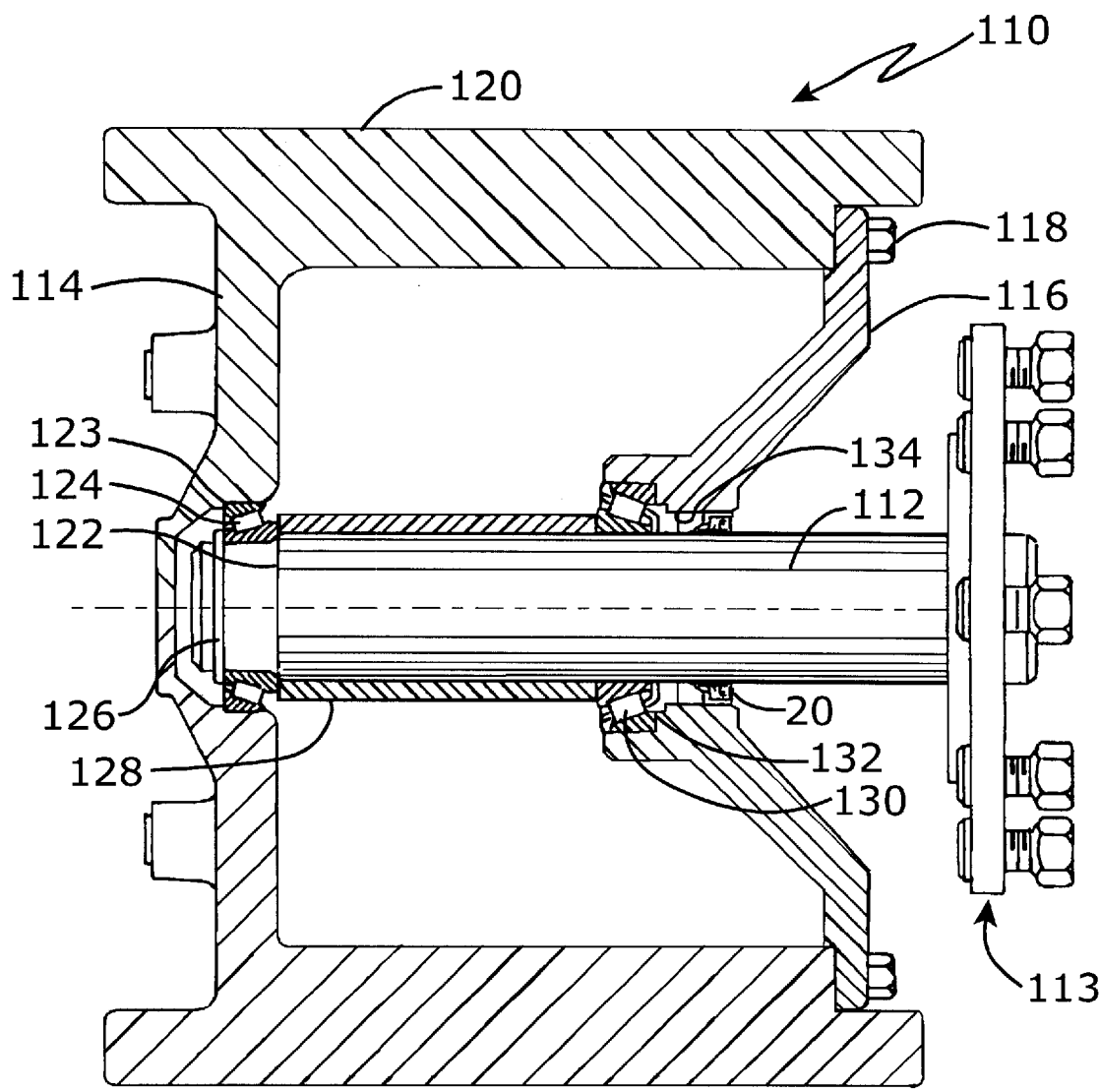
FIG. 4 shows a sample roller assembly into which the flangeless retrofittable severe duty seal for a shaft of FIG. 1 is installed.

FIG. 4 shows a representative application in which the seal 20 may be installed, specifically, a roller assembly 110. The roller 110 is retained on a stub shaft 112 secured with any known stub fastener assembly 113, for example screw fasteners that retain a plate. The roller 110 may be comprised of an end cap 114, opposite a seal cover 116 held in place by cover fasteners 118 such as cap screws that engage, either directly or indirectly, a roller load-contacting peripheral surface 120 situated between the end cap 114 and the seal cover 116. By way of illustration only, and not by way of limitation, a stub shaft 112 may have a shoulder 122 and the end cap 114 may have a shoulder 123 also between which against which a distal roller bearing 124 may fit when affixed to the shaft 112. Adjacent the roller bearing 124 and opposite the shaft shoulder 122, a retainer 126 may be installed on the shaft 112 to prevent the roller 110 from detaching.

A coaxial spacer 128 can be fitted between the distal roller bearing 124 and a medial roller bearing 130. A cover shoulder 132 urges the medial roller bearing 130 against the spacer 128. The seal 20 is fitted into the cover bore 134 to prevent loss of lubricant and to exclude contaminants from the bearings 124 130.

INDUSTRIAL APPLICABILITY

From the foregoing, it may be readily understood by those skilled in the art that the embodiments disclosed are applicable to industry and mechanical power transmission generally, and to machinery and vehicles that are operated in severe environments, particularly. Incorporation of the present embodiment into new and existing equipment is expected to substantially reduce the maintenance requirements of many types of construction and agricultural equipment.

Changes and modifications in the specifically described embodiments can be carried out without departing from the scope of the invention which is intended to be limited only by the scope of the appended claims.

REFERENCES TO DRAWING NUMBERS

| | | | |
|---|---|---|---|
| 20 | Flangeless Retrofittable Severe Duty Seal for a Shaft | 56 | (medial or first) insert side cylindrical surface |
| 21 | shaft (reduced scale) | 57 | (medial or first) insert flange bore |
| 22 | sleeve | 58 | secondary seal lip |
| 24 | sleeve inner end (oil end) | 59 | secondary seal garter spring |
| 26 | sleeve outer end (air end) | 60 | oil side cylindrical insert |
| 28 | sleeve bore | 61 | oil side insert outer surface |
| 30 | sleeve bore elastomeric coating | 62 | oil side insert inner end |
| 32 | sleeve flange | 63 | oil side insert outer end |
| 34 | sleeve flange outer edge | 64 | oil side flange |
| 36 | face lips | 65 | oil side elastomer coating |
| 38 | sleeve flange outer face | 67 | oil side flange bore |
| 40 | perimeter lip | 69 | primary seal excluder lip |
| 42 | seal case | 70 | primary seal lip |
| 44 | case, body | 72 | sleeve outer surface |
| 45 | case outside surface | 74 | primary seal garter spring |
| 46 | case elastomeric coating | 75 | mid-sleeve dust lip |
| 47 | case body inner surface | 76 | forward sleeve dust lip |
| 48 | case outer end | 77 | sleeve flange dust lip |
| 49 | case inner end | 78 | case elastomeric coating chamfer |
| 50 | insert or medial (first) insert | | |
| 51 | (medial or first) insert outer surface | 79 | case outside diameter optional relief channel |
| 52 | (medial or first) insert inner end | 80 | grease |
| 53 | (medial or first) insert outer end | 81 | faceplate |
| 54 | (medial or first) insert flange | 82 | faceplate inner side |
| 55 | (medial or first) insert elastomer portion | 84 | sleeve flange inner face |
| | | 86 | elastomeric faceplate wiper ring |
| 94 | sleeve inner end chamfer | 90 | sleeve radial channel |
| 96 | case inner end chamfer | 92 | sleeve outer end chamfer |
| 97 | case crimp | | |
| 98 | face lip undercut angle | | |
| 100 | alternative, triple lip, main seal | | |
| 110 | roller assembly | | |
| 112 | stub shaft | | |
| 113 | stub shaft fastener assy. | | |
| 114 | end cap | | |
| 116 | seal cover | | |
| 118 | cover fasteners | | |
| 120 | roller load-contacting peripheral surface | | |
| 122 | shaft shoulder | | |
| 123 | end cap shoulder | | |
| 124 | distal roller bearing | | |
| 126 | retainer | | |
| 128 | spacer | | |
| 130 | medial roller bearing | | |
| 132 | cover shoulder | | |
| 134 | cover bore | | |

I claim:

1. An externally flangeless retrofittable unitized radial lip seal for a circular shaft rotatable within and relative to a coaxial bore that receives the shaft comprising:
   a. a sleeve that may be disposed coaxially around the shaft, the sleeve having;
      i. an inner end,
      ii. an outer end,
      iii. a shaft-engaging bore,
      iv. a sleeve outer surface, v. an internal sleeve flange extending radially outward from, and generally perpendicular to, the sleeve outer end, the internal sleeve flange being terminated with an internal sleeve flange outer edge, vi. a circular elastomeric face lip extending coaxially from an internal sleeve flange outer face, vii. an elastomeric perimeter lip extending radially outwardly from the internal sleeve flange outer edge to contact b. a generally cylindrical, hollow seal case adapted for fitting into a bore, the case having;

i. a perimeter lip-contacting inner surface, ii. an outside surface, iii. an outer end opposite, iv. an inner end, v. a case faceplate extending radially inwardly from, and generally perpendicular to, the case outer end, vi. an internal case medial inner flange located between the case outer end and the case inner end, the internal medial inner flange extending radially inward from, and generally perpendicular to, the case body, vii. an internal case oil side inner flange located between the internal medial inner flange and the case inner end, the internal oil side inner flange extending radially inwardly from, and generally perpendicular to, the case body proximate the inner end of the sleeve, viii. at least one sleeve outer surface-contacting main sealing lip, c. said case faceplate having;

i. a faceplate inner side, ii. an outside surface, iii. a central aperture larger than the inside diameter of the sleeve and smaller than the diameter of the sleeve outer surface, iv. the plane of the faceplate inner side oriented generally parallel to a case skirt and the internal sleeve flange, v. the faceplate being formed from the case and in contact with the face lip, and;

d. the main sealing lip is biased against the outer surface of the sleeve.

2. The seal defined in claim 1 wherein the faceplate is made primarily of metal and the faceplate aperture has a faceplate wiper ring proximate the shaft.

3. The seal defined in claim 2 wherein the faceplate is forged from the case material.

4. The seal defined in claim 2 wherein two spaced-apart face lips extend from a sleeve face to contact the faceplate inner side.

5. The seal defined in claim 4 wherein each face lip is formed having a triangular cross-section.

6. The seal defined in claim 5 wherein the angle between the radially inward side of the triangular face lips and the sleeve face is an acute angle.

7. The seal defined in claim 5 wherein the faceplate is formed from the cylindrical case material by drawing.

8. The seal defined in claim 6 wherein the faceplate is formed from the cylindrical case material by drawing.

9. An externally flangeless retrofittable unitized radial lip seal for a circular shaft rotatable within and relative to a coaxial bore that receives the shaft comprising:

a. a sleeve that may be disposed coaxially around the shaft, the sleeve having;

i. an inner end, ii. an outer end, iii. a shaft-engaging bore, the bore being coated with an elastomeric coating, iv. a sleeve outer surface, v. an internal sleeve flange extending radially outward from, and generally perpendicular to, the sleeve outer end, the internal sleeve flange being terminated with an internal sleeve flange outer edge, vi. at least one circular elastomeric face lip extending coaxially from an internal sleeve flange outer face, vii. an elastomeric perimeter lip extending radially outwardly from the internal sleeve flange outer edge to contact b. a generally cylindrical, hollow seal case adapted for fitting into a bore, the case having;

i. a perimeter lip contacting inner surface, ii. an outside surface, iii. an outer end opposite, iv. an inner end, v. a faceplate-forming case skirt extending radially inwardly from, and generally perpendicular to, the case outer end, vi. an internal case medial inner flange located between the case outer end and the case inner end, the internal medial inner flange extending radially inwardly from, and generally perpendicular to, the case body, vii. an internal case oil side inner flange located between the internal case medial inner flange and the case inner end, the internal oil side inner flange extending radially inwardly from, and generally perpendicular to, the case body, viii. at least one sleeve outer surface-contacting main sealing lip affixed to each internal case inner flange, c. a generally planar circular faceplate having;

i. a faceplate inner side, ii. an outside surface, iii. a central aperture slightly larger than the inside diameter of the sleeve, iv. the plane of the faceplate inner side oriented generally parallel to the internal sleeve flange, v. the faceplate being integrally formed form the cylindrical case material, the faceplate inner surface contacting each face lip, and;

d. two main sealing lips biased against the outer surface of the sleeve.

* * * * *

UNITED STATES PATENT AND TRADEMARK OFFICE
CERTIFICATE OF CORRECTION

PATENT NO. : 6,315,296 B1
DATED : November 13, 2001
INVENTOR(S) : Michael R. Oldenburg It is certified that error appears in the above-identified patent and that said Letters Patent is hereby corrected as shown below:

<u>Column 10,</u>
Line 16, reads "side cylindrical surface" should read -- inside cylindrical surface --

Signed and Sealed this

Nineteenth Day of March, 2002

Attest:

Attesting Officer

JAMES E. ROGAN
Director of the United States Patent and Trademark Office